Figure 1:
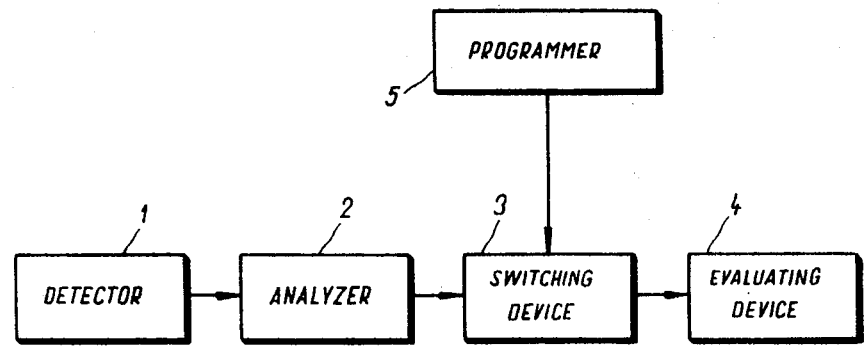

{ # United States Patent

[11] 3,598,112

[72] Inventor Stepan Figar
      Prague, Czechoslovakia
[21] Appl. No. 802,912
[22] Filed Feb. 27, 1969
[45] Patented Aug. 10, 1971
[73] Assignee Ceskoslovenska akademie ved
      Praha, Czechoslovakia
[32] Priority Feb. 29, 1968
[33]  Czechoslovakia
[31]  PV 1593

[54] ARRANGEMENT FOR AUTOMATIC PERFORMING AND EVALUATING OF TEST OF THE ACTIVITY OF FUNCTIONAL SYSTEMS OF LIVING BODIES
8 Claims, 5 Drawing Figs.
[52] U.S. Cl. .................................................. 128/2.1 R, 128/2.05 A
[51] Int. Cl. ................................................... A61b 5/00
[50] Field of Search .......................................... 128/2.05 AS, 2.05 M, 2.05 MS, 2.06, 201

[56] References Cited
UNITED STATES PATENTS

| | | | |
|---|---|---|---|
| 3,101,082 | 8/1963 | Steen et al. | 128/2.05 |
| 3,123,768 | 3/1964 | Burch et al. | 128/2.06 X |
| 3,144,019 | 8/1964 | Haber | 128/2.08 |
| 3,229,685 | 1/1966 | Ringkamp et al. | 128/2.05 |
| 3,267,934 | 8/1966 | Thornton | 128/2.06 |
| 3,495,584 | 2/1970 | Schwalm | 128/2.06 |
| 3,508,537 | 4/1970 | Kahn et al. | 128/2.05 |

Primary Examiner—William E. Kamm
Attorney—Richard Low

ABSTRACT: An arrangement for automatically performing and evaluating biological tests in which a detector for sensing the activities is connected to an analyzer. The analyzer having means for differentiating tests performed at predetermined normal conditions and at undesirable conditions. The detector providing variations in voltages and the analyzer having derivator and integrator means for obtaining a planimetric evaluation of the voltages. Final evaluation is obtained in an evaluating device deriving a signal from the analyzer via a switching device.

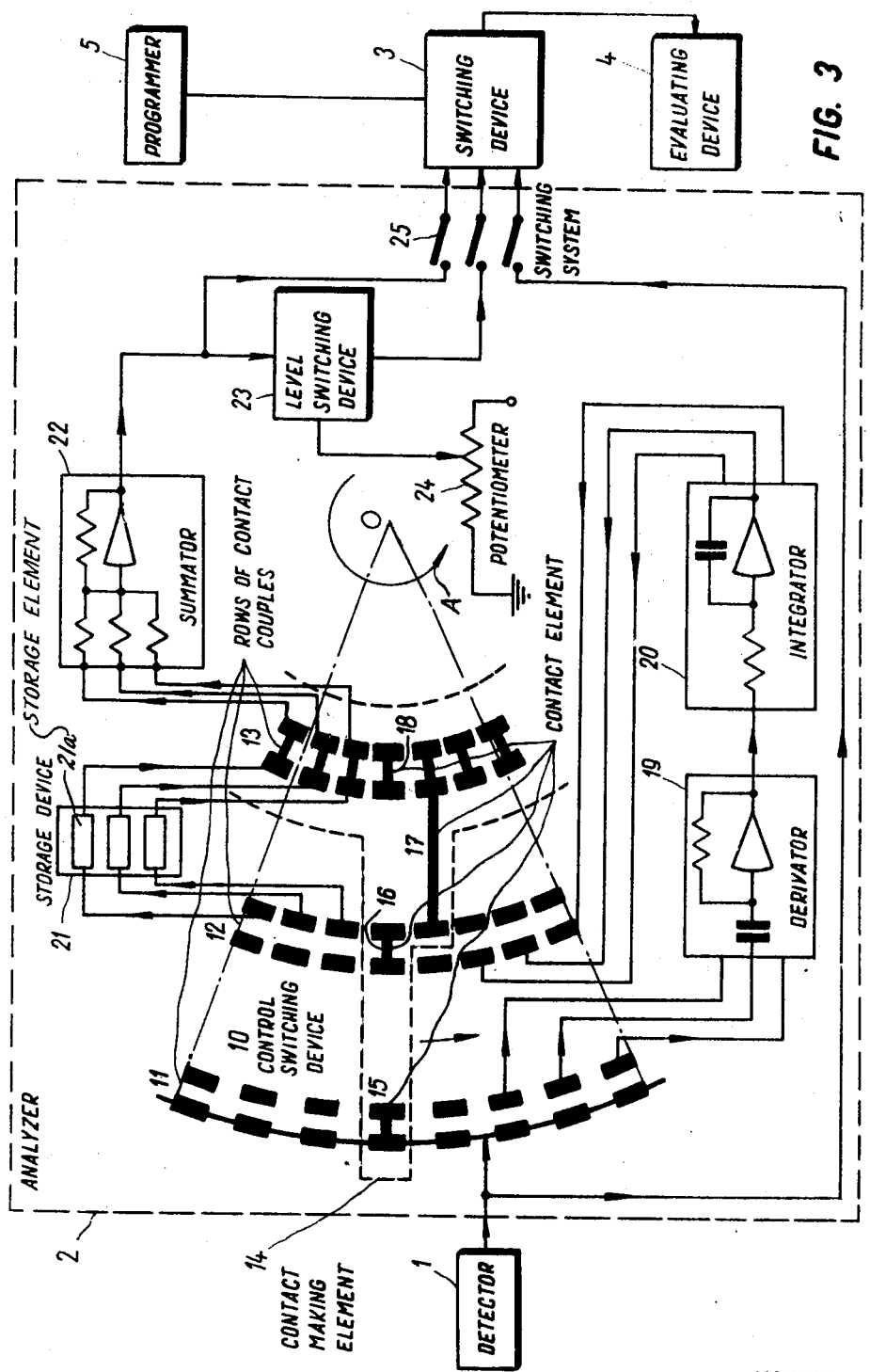

ARRANGEMENT FOR AUTOMATIC PERFORMING AND EVALUATING OF TEST OF THE ACTIVITY OF FUNCTIONAL SYSTEMS OF LIVING BODIES

This invention relates to an arrangement for automatic performance and evaluation of tests of the activity of functional systems of living bodies.

It is frequently required in medical and biological practice to determine the different reactions of living bodies to external influences. A number of methods have be developed in different specialties of medical science. A common feature of most methods is, the elimination of undesirable influences in order to be able to draw from the measurements the correct conclusions. While known methods generally rely on the judgement of the person performing the test, a number of similar tests are frequently made in succession in order to eliminate those tests, where undesirable influences may have occurred. In complicated cases it is frequently very difficult for the attendant to decide by instantaneous perception, whether the tests have been made under correct conditions. The tests are not performed automatically or repeated easily at predetermined time intervals. The attendant must therefore rely on his own experience and perform the tests without objective or quantitative standards. In the course of tests of the so-called "venous and arterial occlusion," the pressure control in the occlusion cuff is performed by means of a manual valve. Equally the pressure in the pressure vessel is obtained by manual pumping of air. One person must therefore constantly attend to the entire arrangement while individual partial measurements are taken. The attendant must constantly follow the course of the plethysmographic curve taking partial measurements only if said curve is relatively stable. The proper evaluation of partial results is therefore relatively complicated as it is derived both from the steepness of the rising plethysmographic curve immediately after introduction of the venous occlusion, from the basic volume of the measured tissue and from the time, in the course of which said increase of volume has occurred. It is equally necessary to consider factors resulting from the proper compressing of the tissue, its elastic properties and such. In practice measurements are therefore generally taken in the course of the second, third and fourth beat of the pulse after introduction of the occlusion, or the measurement is limited by a standard time interval, or the steepness of the raising plethysmographic curve is expressed by means of an angle between a line passing in direction of the overall raising of the curve and between the base of the plethysmographic curve. The results of measurements of the blood circulation are generally expressed in milliliters per 100 ccm. of tissue within 1 minute. The evaluation of results from a larger number of partial measurement is thus of course very difficult.

There is at present no arrangement which would perform automatically a complex evaluation of investigated biological functions according to a predetermined program, taking into account the preceding course of said functions and with regard to prior chosen conditions for evaluating the biological activities, and which would simultaneously decide the acceptability of individual partial test with regard to existing conditions of the biological activities and which would also provide quantitative results individual tests or also their mean values.

It is an object of this invention to provide an arrangement which would allow reliable tests of the above-mentioned kind to be performed and reproduced.

It is another object of this this invention to provide an arrangement where results of tests at certain predetermined conditions would be always obtained, eliminating results where such conditions are not met.

It is still another object of this invention to provide an arrangement where such tests would proceed automatically, whereby the operator would only adjust those conditions, which require adjustments.

It is a further object of this invention allow certain number of tests to be performed in predetermined time intervals with means for evaluating the results of such tests.

Figure 2:
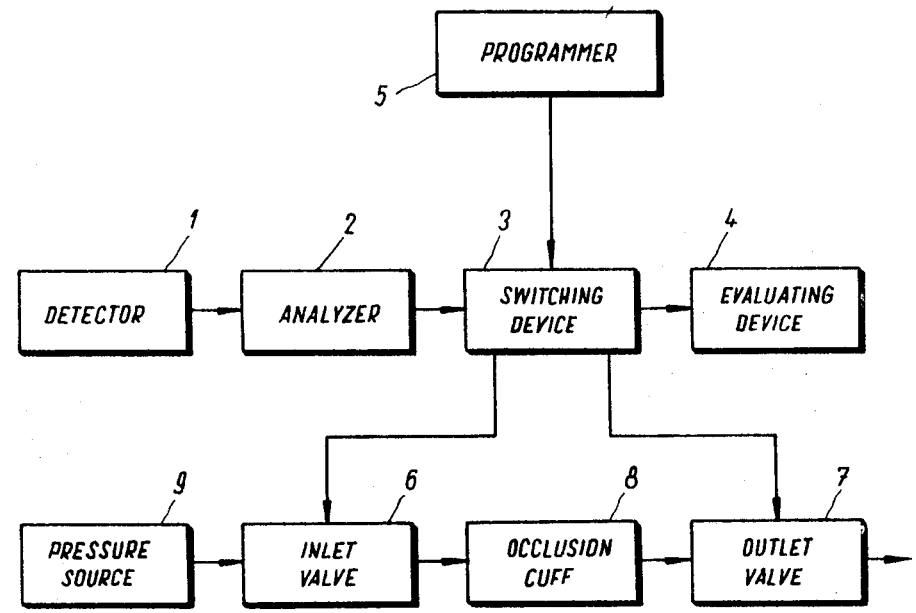

Examples of arrangements according to this invention will be described in detail in the following on hand of drawings where FIG. 1 is a block diagram of the fundamental apparatus required for such tests FIG. 2 is a block diagram of apparatus required for tests of the venous and arterial occlusion FIG. 3 a wiring diagram of the analyzer of FIG. 1

Figure 4:
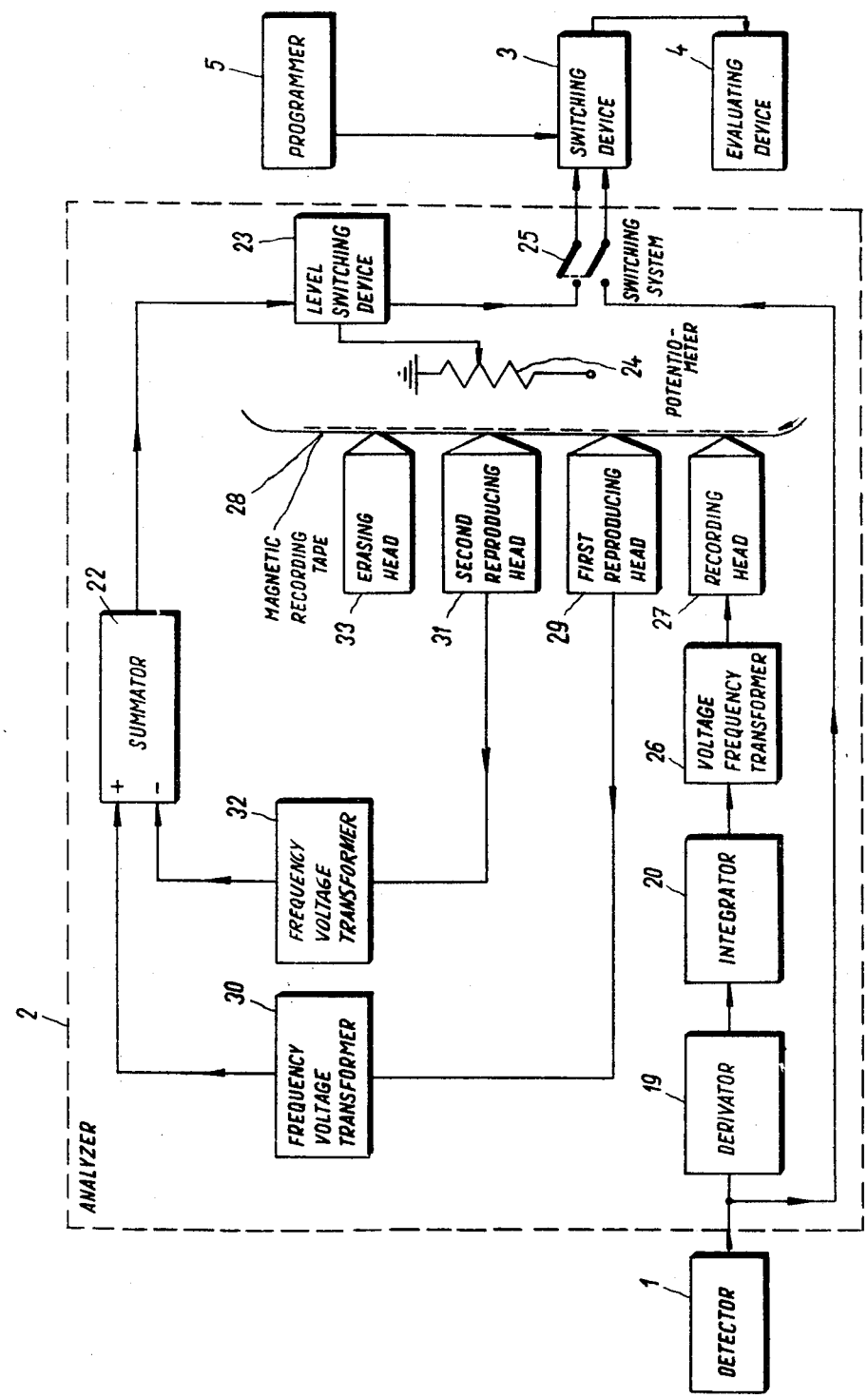
Figure 5:
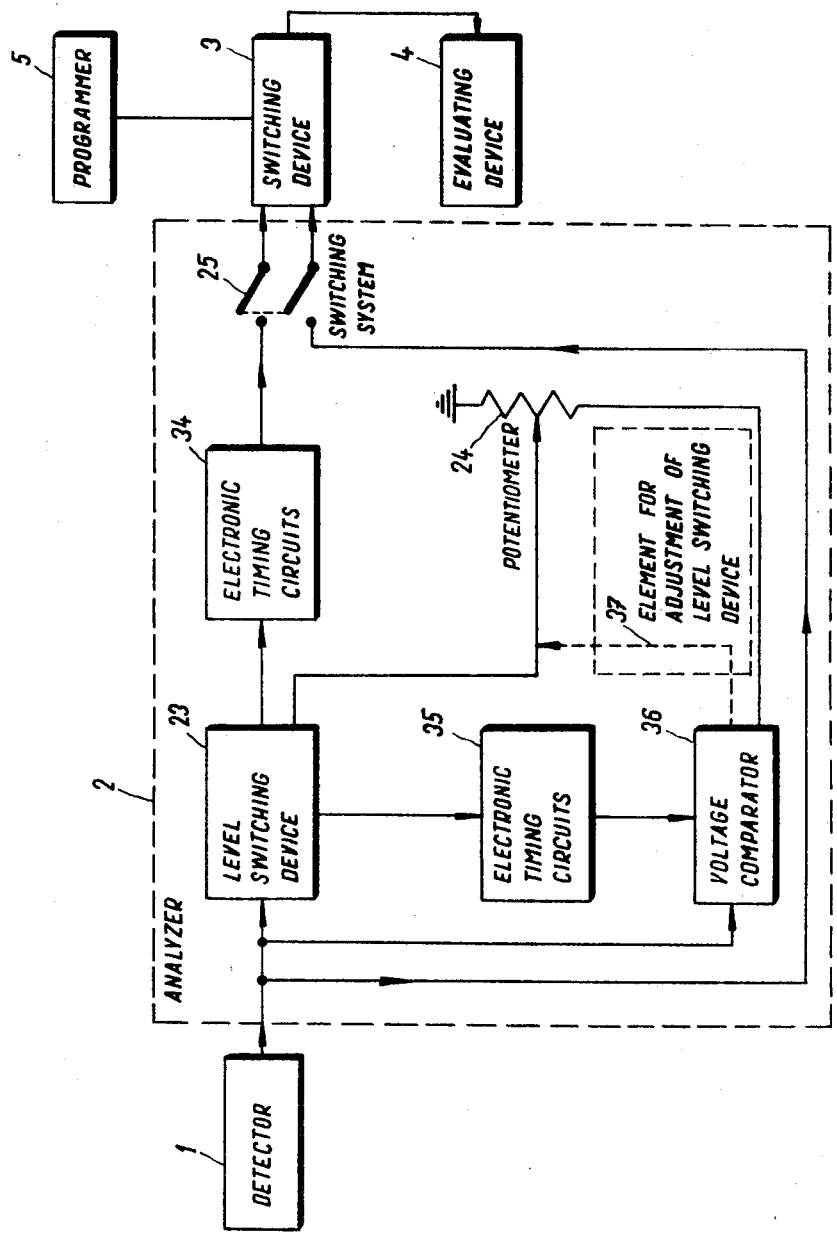

FIG. 4 is a similar block wiring diagram with another embodiment of the analyzer and FIG. 5 a third more simple embodiment of the analyzer.

With reference to FIG. 1 we see a detector 1 which records the biological activity of the living body, which detector may comprise any known device for sensing, following or registering physiological functions as for instance a plethysmograph, an electroencephalograph, an electromyograph, an electrocardiograph, a device for measuring the skin activity or skin temperature, a pneumograph or the like. Changes of the output voltage from the detector 1 are supplied to the analyzer 2. One embodiment of the analyzer 2 is indicated in FIG. 3. The output from the detector is supplied to a control-switching device 10 provided with three rows 11, 12 and 13 of couples of contacts with a contact-making element 14. The analyzer 2 also comprises a derivator 19, an integrator 20, a storage device 21 having a plurality of storage elements 21a, a summator 22, a voltage-level-switching device 23 controlled by a potentiometer 24 and a switch system 25. The detector 1, is connected by way of the switch system 25 with the switching device 3 and with the evaluating device 4 seen in FIG. 1. The control-switching device 10 can be for instance represented by a rotary selector switch or another similar switch with periodical operation comprising three rows 11, 12 and 13 of couples of contacts, whereby all first contacts of the row 11 are mutually interconnected and connected to the output of the detector 1. The signal voltage from detector 1 is furthermore distributed by means of the contact-making element 14 which can be substantially of the shape of an arm rotating around an axis coincident with the axis of said three rows 11, 12, 13 of contacts and performing a circular or other periodic movement, in the direction of arrow A whereby it sweeps the contact couples of the rows 11, 12, 13. The contact-making element 14 comprises a contact element 15 for bridging contact couples in row 11, a contact element 16 for bridging contact couples in row 12, a contact element 17 for bridging contacts of the row 12 with corresponding contacts of row 13 and finally an arbitrary chosen number n of contact elements 18 for bridging of contact couples of row 13. The contact elements 15, 16, 17, 18 of the contact-making element 14 can be for instance conductive strips, electrically contacting the conductively corresponding contacts of rows 11, 12, 13. The contacts in the row 11 provide for the connection of the output of the detector 1 with the derivator 19 and subsequently with the integrator 20; the contacts of row 12 connects the integrator 20 with storage elements of the storage device 21; and the contacts of row 13 interconnect the storage elements of the storage device 21 with the summator 22. The contact element 17 connects the cooperating contacts of rows 12 and 13. This contact is located so that it always joins that contact couple in rows 12 and 13, which is next in direction of movement of the contact-making element 14, so that an erasing of the information, stored in the respective storage element of the storage device 21 is accomplished. (This may be accomplished by a short circuiting and discharging of a capacitor). The shape of the contact-making element 14 is chosen so as to permit interconnection of a contact couple in row 11, with a corresponding contact couple in row 12, and of cooperating contacts between rows 12 and 13, with respect to interconnected contact couples in rows 11 and 12 next in direction of movement of contact-making element 14 and finally to obtain a simultaneous interconnection of an arbitrary chosen number n of cooperating contact couples of row 13. The number of contact couples must be for all rows higher by one than the arbitrary chosen number 52 $n$ of contact element 18. All rows 11, 12, 13 have therefore ($n+1$) contact couples. The movement of the contact-making element 14 can be also discontinuous, for instance a step-by-step movement. Its speed can be adjustable.

The signal voltage from the detector 1 passes by means of the contact-making element 14 over the row 11 of contacts to the derivator 19, reacting on changes of voltage and on the steepness of said signals. The output variations from the derivator 19 are supplied to the integrator 20, where they are integrated within a time interval, within which the interconnection of contacts of the row 11 is accomplished. The resulting integration or planimetric value of the derivation voltage on the output of the integrator 20 is furthermore supplied via contacts in row 12 to the corresponding storage element of the storage device 21. Said storage elements can be for instance capacitors or after corresponding adjustments of the signal other means, for instance an impulse counter. The hole body of information, stored in all the storage elements of the storage device 21, the number of ,r which elements is equal to the number of contact couples of rows 11, 12, 13, that means ($n+1$), is supplied via the contacts of row 13 to the summator 22.

If in the course of operation of the analyzer 2 one of the storage elements of the storage device 21 is out of operation i.e.: by short circuiting by means of the contact element 17) the resulting voltage value on the output of the summator 22 is equal to the sum of the individual integration (planimetric) values, stored in the arbitrary chosen number of $n$ storage elements of the storage device 21. This would occur in the course of one operating cycle of the contact-making element 14. This total time interval (operating cycle) is adjustable and is determined both by the arbitrary chosen number ($n+1$) of contact couples of rows 11, 12, 13 and of storage elements of the storage device 21 and by the speed of movement of the contact-making element 14. A partial time interval, during which the derivation and integration of the investigated partial values are accomplished, are determined by the time, during which the individual interconnections of the contact couples of row 11 are realized. This partial time is based on a continuous movement of the contact-making element 14 determined both by the speed of movement of the contact-making element 14 and by the width of the contacts of row 11. For a discontinuous (step-by-step) movement, this partial time is determined by the length of the individual stops of the contact-making element 14 on the individual contacts of row 11. The output value of the summator 22 is in each moment of operation of the analyzer 2 the integral value of differentiated voltage variations, received from the detector 1. This value corresponds at each moment of operation only to the last or immediately preceding time interval, the length of which has been arbitrary chosen.

The output voltage from the summator 22 is furthermore supplied to the switching device 23, the operation of which is adjustable in dependence on voltage. The switching device 23 can be for instance a voltage-level-switching device, adjusted by the potentiometer 24. The function of the voltage-level-switching device 23 may be performed by a Schmitt flip-flop circuit in connection with a relay. By adjustment of the potentiometer 24 to the required value, the limits of acceptability of the extent and magnitude of voltage variations received from the detector 1 in the course of the immediately preceding time interval, chosen arbitrarily by the respective adjustment of the operating time of the working cycle of the contact-making elements 14 of the control-switching device 10 can be thus adjusted.

The output of the voltage-level-switching device 23 is connected with the switching device 3 by way of the switch system 25. The summator 22 is equally connected with the switching device 3 by way of the switch system 25, as is also the detector 1. It is possible to place the analyzer 2 out of operation while maintaining the function of all remaining parts of the whole arrangement, or if needed, to independently supply signals from the summator 22 by way of the switch system 25 and the switching device 3 to a counter of the evaluating device 4.

The analyzer shown in FIG. 4 has substantially the same major components as that shown in FIG. 3 with the difference, that the control-switching device 10 and the storage elements of the storage device 21 are replaced by a magnetic recording device.

The detector 1 is again connected with a derivator 19, the derivator 19 with an integrator 20, the integrator 20 by way of a voltage frequency transformer 26 with a magnetic recording head 27 adapted for storing the respective informations on a magnetic recording tape 28 which is either wound off a reel or circulating as an endless reel. A first reproducing head 29 arranged very close to the recording head 27 picks up the information from the recording tape 28. The reproducing head 29 is connected by way of a frequency-voltage transformer 30 with an addition circuit of the summator 22. A second magnetic reproducing head 31 is arranged at an arbitrarily chosen distance from the first reproducing head 29 and is connected by way of a frequency-voltage transformer 32 with a subtraction circuit of the summator 22. An erasing head 33 is provided behind the second reproducing head 31 in direction of movement of the magnetic tape 28. The summator 22 is connected with the switching device 3 both by way of the switch system 25 and by way of the voltage-level-switching device 23 controlled by a potentiometer 24 and by way of said switch system 25. The detector 1 is connected with the switching device 23 over the switch system 25. The arrangement operates similarly as the one described in connection with FIG. 3 with the difference that the processing of signals from the detector 1 can also proceed continuously (analogous) whereas it can proceed in the first case only discontinuous (digital). The adjustment of the length of the time interval of analyzing is accomplished in the second case by adjustment of the mutual distance of both reproducing heads 29 and 31 cooperating with the magnetic recording tape 28.

A third, more simple alternative embodiment of the analyzer 2 is shown in FIG. 5. The detector 1 is connected with the switching device 3 both via the switch system 25 and via a voltage-level-switching device 23, electronic timing circuits 34 and the switch system 25. The voltage-level-switching device 23 is controlled by a potentiometer 24 and is in addition connected by way of electronic timing circuits 35 with a voltage comparator 36. Voltage variations from the detector 1 are also supplied to the voltage comparator potentiometer 24. The output of the comparator 36 comprises an element 37 for the adjustment of the operation of the voltage-level-switching device 23, for instance some known element which controls the voltage on the potentiometer 24.

The required allowable limits of voltage variations supplied from detector 1 can be adjusted by means of the potentiometer 24, whereby the voltage-level-switching device 3 stops the operation of the electronic timing circuits 34 if any excess variations occurs and reestablishes their operation after the voltage variations from the detector 1 have reached values below the adjusted limits. The electronic timing circuits 34 are connected to the switching device 3 and establish the circuit only after lapse of the required time interval, which interval is adjusted on the electronic timing circuits 34 according to predetermined desired limits. The voltage comparator 36 connected to the electronic timing circuit 35 enables an automatic reestablishment of the operation of the analyzer 2 on any voltage level of voltage variations received from the detector 1 if said values are for a certain time on another level than that of original adjustment of the voltage-level-switching device 23 and if said values vary around the new level within the adjusted limits. The electronic timing circuits 33 enable the adjustment of the length of the time interval. Due to the operation of the voltage-level-switching device 23 no analysis is performed within the time interval in the analyzer 2 after each surpassing of the allowable limits of voltage variations supplied by the detector 1. After lapse of a time interval (as adjusted by the electronic timing circuits 35) the operation of the voltage-level-switching device 23 is (by means of the voltage comparator 36) adjusted to the voltage level corresponding to the actual condition of the level of the voltage variations supplied by the detector 1 and corresponding equally to the chosen limits of variations of said values. Thus an automatic reestablishment of the operation of the analyzer 2 is accomplished after a predetermined time interval on a voltage level of variations from the detector 1 so far as said variations are within the chosen limits adjusted on the electronic timing circuits 35 which lapsed from the moment of the last surpassing of allowable limits adjusted by the potentiometer 24 on the voltage-level-switching device 23 due to fluctuation of the magnitude of voltage variations supplied by the detector 1.

The arrangement according to FIG. 5 can at any instant consider the investigated courses of voltage variations insofar as the occurrence of voltage variations is concerned and insofar as their magnitude is allowable or not according to chosen limits in the course of the last, immediately preceding lapsed time interval, the length of which has been chosen arbitrarily. This arrangement however cannot follow paths of voltage variations according to their planimetric value for the chosen time interval as it is the case for the arrangement according to FIGS. 3 and 4.

Returning to FIGS. 1 and 2 the evaluating device 4 connected to the switching device 3 can for instance comprise, where measurement of blood circulation is made a counter of real values of the biologic activity at any arbitrary time interval. This operation can be performed by some of the calculating machines currently on sale, adapted to these conditions, as for instance by the hybrid calculating machine LINC 8 of Digital Equipment Corporation. The selection of the time interval in the course of which the calculating machine has to process impulses from the analyzer 2 can be also made by impulses from a programmer 5 supplied to the calculating machine via the switching device 3 or it can be determined by electronic timing circuits built in the analyzer 2, or manually by controlling a switch. The programmer can be any known electrical or mechanical device generating electric impulses in selectable time intervals. In addition to the calculator for evaluation of the real values of biologic activity (or in case of measurements of blood circulation in volumetric units passed through a volumetric unit of the measured tissue in a time unit,) the evaluating device 4 comprises an arrangement for evaluating mean values from results of individual partial tests. This function can be performed by some known calculating machines currently on sale, for instance by the aforementioned calculating machine LINC 8 of the Digital Equipment Corporation.

The transmission of the stimula to the organism is started and finished by impulses from the programmer 5, supplied via the switching device 3 to some device for generating stimula, which may be for instance a source of electric light, an electric source of sound, an electric skin stimulator, an electromechanical device for generating pressure on the organism or on some part of it and similar.

In a special case where tests of the so-called "venous and arterial occlusion" have to be performed this arrangement can comprise elements indicated in FIG. 2 where the impulses from the programmer 5 are supplied via relay contacts of the switching device 3 to an inlet valve 6 and to an outlet valve 7 connected to an occlusion cuff 8, said occlusion cuff 8 connected by way of the inlet valve 6 with an adjustable source 9 of pressurized air, for instance with a pressure vessel and by way of the outlet valve 7 with ambient air. In case of measurements of the venous and arterial occlusion an electrocapacitive plethysmograph may be used as the sensing device of the detector 1. Suitable sensing devices are disclosed in U.S. Pat. No. 3,361,129 or No. 3,398,740. In that event the evaluating device 4 can also be provided with a device for calculating the original value of the volume of the live tissue, inserted into the electrocapacitive plethysmographic sensing device based on measurements of differences of the electric capacity, created when the investigated part of the body is inserted into the plethysmographic sensing device.

The described arrangement enables an automatic operation when performing the above-mentioned tests. Simultaneously the possibility of manual operation of the switching device 3 is maintained and thus also the possibility to perform partial tests beyond the program stipulated by the programmer 5. The partial measuring is not accomplished in case of automatic operation, if the stability of the biologic activities does not correspond to chosen limits. Measurements of the blood circulation may be accomplished by the corresponding adjustment of the switching on and off of the interconnection between the programmer 5 and the valves 6 and 7 in dependence on the required level of the valves of the biologic activity adjusted in the analyzer 2. The evaluating device 4 performs the integration of spontaneous and artificially generated variation of the biological activity in the case given of the blood circulation. The switching device 3 can signal situations where this activity exceeds the prior adjusted limits according to values placed into the analyzer 2. The evaluating device 4 can also perform calculations of real values of the biological activity.

In a similar manner it is possible to proceed with the investigation of other biological activities when it is necessary to eliminate results of measurements obtained at undesirable conditions.

I claim:

1. An arrangement for the automatic performing and evaluating of tests of the activity of functional systems of living bodies comprising:
   a detector for sensing said activities, an analyzer for analyzing conditions at which said activities proceed,
   a switching device,
   an evaluating device,
   said detector having means for generating voltage variations in accordance with the measured activities, and means for supplying said voltage variations to the input of the analyzer,
   the analyzer having means for differentiating tests performed at predetermined normal conditions from tests performed at undesirable conditions, and having derivator and integrator means for obtaining a planimetric evaluation of the voltages received from said detector when said level of activity is stabilized on a predetermined level, a voltage-level-switching device for adjusting the range of said predetermined level, and means for supplying said evaluation to said first-mentioned switching device,
   the first-mentioned switching device having means connecting said analyzer to said evaluating device for supplying results of tests which proceeded at normal predetermined conditions eliminating tests performed at undesirable conditions.

2. An arrangement as set forth in claim 1, said analyzer including a control-switching device, a storage device with a number of storage elements, and a summator, said control-switching device connecting in succession the outputs of said detector corresponding to subsequent tests, to said derivator, the output of which is connected to said integrator, the output of which is in turn connected to successive storage elements of said storage device, said storage elements connected to said summator, the output of which is connected to said voltage-level-switching device where differentiating of the performed tests is accomplished.

3. An arrangements as set forth in claim 2 comprising in addition to a switch system enabling bypassing of the whole analyzer and in addition the connection of the summator directly to the evaluating device by way of said switching device.

4. An arrangement as set forth in claim 1, including a magnetic tape recording and reproducing device comprising a recording head, two reproducing heads at a certain mutual distance in direction of movement of the recording tape and erasing head, and a summator with an addition and a subtraction circuit, the output of the detector connected to said derivator, the output of the derivator connected to said integrator, the output of the integrator supplied to said magnetic recording head cooperating with said magnetic recording tape, the output of the first magnetic reproducing head supplied to the addition circuit of the summator, the output of the second magnetic reproducing head supplied to the subtraction circuit of the summator, the output of the summator connected to said voltage-level-switching device where differentiating of the performed tests is accomplished.

5. An arrangement as set fourth in claim 4 comprising a switch system enabling bypassing of the whole analyzer.

6. An arrangement as set forth in claim 1 said analyzer comprising a voltage-level-switching device, a first and a second electronic timing device, a voltage comparator and means for adjusting the function of the voltage-level-switching device, said voltage-level-switching device connected to the output of the detector, the output of the voltage-level-switching device connected to both electronic timing devices, the output of the first electronic timing device connected to the switching device, the second electronic timing device connected to said comparator, a second input of the comparator connected to the output of the detector, the output of said comparator connected to said means for adjusting the function of the voltage-level-switching device.

7. An arrangement as set forth in claim 6 comprising a switch system, enabling bypassing of the whole analyzer.

8. An arrangement as set forth in claim 1 said evaluating device comprising a counter for evaluation of real instantaneous and average values of biologic activities.